(12) United States Patent
Shimizu et al.

(10) Patent No.: US 9,976,009 B2
(45) Date of Patent: May 22, 2018

(54) BINDER AND AQUEOUS SOLUTION

(71) Applicant: Nippon Shokubai Co., Ltd., Osaka (JP)

(72) Inventors: Ikuo Shimizu, Osaka (JP); Takashi Yamamoto, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days. days.

(21) Appl. No.: 15/528,805

(22) PCT Filed: Dec. 16, 2015

(86) PCT No.: PCT/JP2015/085129
§ 371 (c)(1),
(2) Date: May 23, 2017

(87) PCT Pub. No.: WO2016/104261
PCT Pub. Date: Jun. 30, 2016

(65) Prior Publication Data
US 2017/0321032 A1  Nov. 9, 2017

(30) Foreign Application Priority Data

Dec. 26, 2014 (JP) .................................. 2014-263714

(51) Int. Cl.
*C08K 3/30* (2006.01)
(52) U.S. Cl.
CPC ........ *C08K 3/30* (2013.01); *C08K 2003/3054* (2013.01)
(58) Field of Classification Search
CPC .......................... C08K 3/30; C08K 2003/3054
USPC ....................................................... 524/423
See application file for complete search history.

(56) References Cited

U.S. PATENT DOCUMENTS

| 5,661,213 | A  | 8/1997 | Arkens |
| 2005/0048212 | A1 | 3/2005 | Clamen |
| 2010/0098947 | A1 | 4/2010 | Inoue |
| 2013/0150521 | A1 | 6/2013 | Matsuo |

FOREIGN PATENT DOCUMENTS

| CN | 103965392 | A | 8/2014 | |
| CN | 106795247 | A | 5/2017 | |
| JP | 06-184285 | A | 7/1994 | |
| JP | 10-509485 | A | 9/1998 | |
| JP | 2000-063181 | A | 2/2000 | |
| JP | 2005-068399 | A | 3/2005 | |
| JP | 2006-089906 | A | 4/2006 | |
| JP | 2007-146315 | A | 6/2007 | |
| JP | 2007-211161 | A | 8/2007 | |
| JP | 2012-136412 | A | 7/2012 | |
| JP | 2012-238572 | A | 12/2012 | |
| JP | 2015-143320 | A | 8/2015 | |
| WO | 96/15075 | A1 | 5/1996 | |
| WO | WO9615075 | * | 5/1996 | ............. C03C 25/02 |
| WO | 2011/162277 | A1 | 12/2011 | |

OTHER PUBLICATIONS

International Search Report for PCT/JP2015/085129 dated Mar. 15, 2016.
Chinese Office action for 201580070592.7 dated Jan. 8, 2018.

* cited by examiner

*Primary Examiner* — Hui Chin
(74) *Attorney, Agent, or Firm* — Pearne & Gordon LLP

(57) ABSTRACT

Provided is a binder that has satisfactory storage stability and can express an excellent bonding strength for a glass fiber or powdered glass (impart a satisfactory strength to a bonded body with the glass fiber or the powdered glass). The binder of the present invention includes: a polymer having a hydroxyl group; and an ammonium salt of an inorganic acid, in which: the polymer contains a specific structural unit derived from a monomer represented by the general formula (1) and a specific structural unit derived from a monomer containing a carboxylic acid (salt) group.

2 Claims, No Drawings

BINDER AND AQUEOUS SOLUTION

TECHNICAL FIELD

The present invention relates to a binder containing a polymer having a hydroxyl group, and more specifically, to a binder containing a polymer having a hydroxyl group, which is useful as a binder for a glass fiber or powdered glass. The present invention also relates to an aqueous solution containing a polymer having a hydroxyl group.

BACKGROUND ART

A heat-resistant molded body, which is obtained by causing a binder to adhere to a glass fiber or the like, and by molding the resultant into a mat shape, has been widely used as, for example, a heat-insulating material for a house, a warehouse, an apparatus, an instrument, or the like. A phenol-formaldehyde binder has been widely used as the binder. However, the phenol-formaldehyde binder involves a problem in that unreacted formaldehyde remains in a molded body, and hence formaldehyde is discharged after the construction of a house or the like. Accordingly, a binder that does not discharge formaldehyde has been investigated.

In, for example, Patent Literature 1, there is a disclosure of a binder for a mineral fiber, which is formed of a vinyl copolymer (A) having an organic acid (salt) group (a) and a hydroxyl group, and having a weight-average molecular weight of from 500 to 100,000. In Patent Literature 1, there is a disclosure that the binder for a mineral fiber exhibits the following effects: (1) the binder is free of formaldehyde, and formaldehyde is not discharged from a heat-insulating material obtained by bonding mineral fibers to each other with the binder and molding the resultant into a mat shape; (2) the binder is superior to a conventional phenol resin in adhesive property with a mineral fiber and in restorability of the heat-insulating material against compression; (3) a binder in the form of an aqueous solution or an aqueous dispersion out of the binders of the present invention is excellent in environmental adaptability and is easily recycled; and (4) the binder shows satisfactory physical properties, such as an adhesive property, even in a neutral region.

In Patent Literature 2, there is a disclosure of a glass fiber binder, which is formed of an aqueous solution of: (1) a copolymer formed of a product of a reaction between a polymerizable carboxylic acid or an anhydride thereof, or a mixture thereof, and a hydroxyalkyl acrylate or methacrylate having a $C_2$ to $C_8$ alkyl group, or a mixture thereof; and (2) an alkali metal salt of a phosphorus-containing acid. In Patent Literature 2, there is a disclosure that the binder has low viscosity when the binder is not cured, and has structural rigidity when the binder is cured.

In Patent Literature 3, there is a disclosure of an aqueous binder for a mineral fiber containing a (co)polymer (A) having at least two carboxyl groups or acid anhydride groups, a compound (B) having at least one hydroxyl group and at least one amino group, and water, in which the neutralization ratio of carboxyl groups derived from the carboxyl groups or the acid anhydride groups in the (A) is from 36 eq % to 70 eq %, and the neutralization is neutralization with an amino group in the (B). In Patent Literature 3, there is a disclosure that the aqueous binder for a mineral fiber exhibits the following effects: (1) the binder is free of formaldehyde; (2) the binder is excellent in water resistance and hydrolysis resistance; (3) the binder is excellent in adhesive property with a mineral fiber; and (4) a mineral fiber laminate obtained by bonding mineral fibers to each other with the binder is excellent in restorability against compression.

In Patent Literature 4, there is a disclosure of an aqueous binder for an inorganic fiber containing an acrylic resin having an acid value of from 350 mgKOH/g to 850 mgKOH/g, a cross-linking agent containing at least one kind of dialkanolamine, a curing accelerator, and an ammonium salt of an inorganic acid, in which: the molar ratio of the total number of moles of hydroxyl groups and imino groups in the cross-linking agent to the number of moles of carboxyl groups in the acrylic resin is from 0.8 to 1.5; and the pH of the binder is adjusted to from 6.0 to 8.0 with a volatile basic compound. In Patent Literature 4, there is a disclosure of the following. An ammonium ion is volatilized as ammonia by the heating of the ammonium salt of the inorganic acid in a binder-curing step, and hence the residue remains as an acid in the binder. Accordingly, the neutralization of an alkali component eluted from an inorganic fiber can suppress the hydrolysis of a cross-linked portion in the binder, and hence enables long-term maintenance of various physical properties of an inorganic fiber heat-insulating sound-absorbing material.

In Patent Literature 5, there is a disclosure of an aqueous binder for an inorganic fiber heat-insulating sound-absorbing material containing an acrylic resin having an acid value of from 350 mgKOH/g to 850 mgKOH/g, a cross-linking agent containing at least one kind of alkanolamine, and an ammonium salt of an inorganic acid, in which: the binder contains 5.5 parts by mass to 10 parts by mass of the ammonium salt of the inorganic acid with respect to 100 parts by mass of the total of the acrylic resin and the cross-linking agent; the molar ratio of the total number of moles of hydroxyl groups, amino groups, and imino groups in the cross-linking agent to the number of moles of carboxyl groups in the acrylic resin is from 0.8 to 1.5; and the pH of the binder is adjusted to from 5.0 to 8.0 with a basic compound. In Patent Literature 5, there is a disclosure of the following. The aqueous binder for an inorganic fiber heat-insulating sound-absorbing material is a binder formed of the acrylic resin and free of formaldehyde, and hence the binder cures without emitting formaldehyde and the environmental load of its exhaust gas or the like can be reduced. In addition, the binder is excellent in curability, and hence even when a heat curing temperature is low, the cross-linking reaction of the binder rapidly progresses to provide a strong binder cured product.

As described above, various binders for glass fibers and the like each free of formaldehyde have been proposed. However, each of those binders involves a problem in that the strength of a glass fiber or the like treated with the binder is not sufficient, or a problem in that the storage stability of the binder is not sufficient.

CITATION LIST

Patent Literature

[PTL 1] JP 2006-89906 A
[PTL 2] JP 10-509485 A
[PTL 3] JP 2012-136412 A
[PTL 4] JP 2007-146315 A
[PTL 5] WO 11/162277 A1

SUMMARY OF INVENTION

Technical Problem

The present invention has been made by paying attention to the above-mentioned circumstances, and an object of the present invention is to provide a binder that has satisfactory storage stability, and can express an excellent bonding strength for a glass fiber or powdered glass (impart a satisfactory strength to a bonded body with the glass fiber or the powdered glass).

Solution to Problem

The inventors of the present invention have made extensive investigations, and as a result, have found that when a binder contains a predetermined polymer and an ammonium salt of an inorganic acid, the binder has satisfactory storage stability and can improve the strength of a bonded body with a glass fiber or powdered glass. The inventors have completed the present invention on the basis of such finding.

A binder according to one embodiment of the present invention includes: a polymer having a hydroxyl group; and an ammonium salt of an inorganic acid, in which:
the polymer contains a structural unit derived from a monomer represented by the general formula (1) and a structural unit derived from a monomer containing a carboxylic acid (salt) group;
a content of the structural unit derived from the monomer represented by the general formula (1) is from 5 mol % to 40 mol % with respect to 100 mol % of structural units derived from all monomers;
a content of the structural unit derived from the monomer containing a carboxylic acid (salt) group is from 60 mol % to 95 mol % with respect to 100 mol % of the structural units derived from all the monomers;
2 mol % or more of the carboxylic acid (salt) groups in the polymer are neutralized with a volatile base and/or a nonvolatile base;
0 mol % to 35 mol % of the carboxylic acid (salt) groups in the polymer are neutralized with the nonvolatile base; and
0 mol % to 100 mol % of the carboxylic acid (salt) groups in the polymer are neutralized with the volatile base:

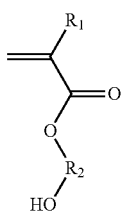

General formula (1)

in the general formula (1), $R_1$ represents a hydrogen atom or a methyl group, and $R_2$ represents an organic group having 2 to 20 carbon atoms.

An aqueous solution according to one embodiment of the present invention includes: a polymer having a hydroxyl group; and an ammonium salt of an inorganic acid, in which:
the polymer contains a structural unit derived from a monomer represented by the general formula (1) and a structural unit derived from a monomer containing a carboxylic acid (salt) group;
a content of the structural unit derived from the monomer represented by the general formula (1) is from 5 mol % to 40 mol % with respect to 100 mol % of structural units derived from all monomers;
a content of the structural unit derived from the monomer containing a carboxylic acid (salt) group is from 60 mol % to 95 mol % with respect to 100 mol % of the structural units derived from all the monomers;
2 mol % or more of the carboxylic acid (salt) groups in the polymer are neutralized with a volatile base and/or a nonvolatile base;
0 mol % to 35 mol % of the carboxylic acid (salt) groups in the polymer are neutralized with the nonvolatile base;
0 mol % to 100 mol % of the carboxylic acid (salt) groups in the polymer are neutralized with the volatile base; and
the aqueous solution contains 20 mass % or more and 99.9 mass % or less of water:

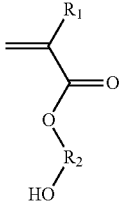

General formula (1)

in the general formula (1), $R_1$ represents a hydrogen atom or a methyl group, and $R_2$ represents an organic group having 2 to 20 carbon atoms.

Advantageous Effects of Invention

The binder of the present invention has satisfactory storage stability, and a glass fiber or powdered glass can express a satisfactory strength when treated with the binder of the present invention. Accordingly, the binder of the present invention can be usefully used as, for example, a binder for a heat-insulating material for a house.

DESCRIPTION OF EMBODIMENTS

The present invention is described in detail below. A combination of two or more individual preferred modes of the present invention described below is also a preferred mode of the present invention.

[Polymer Having Hydroxyl Group]

A binder of the present invention contains a polymer having a hydroxyl group, and the polymer contains a structural unit derived from a monomer represented by the general formula (1). The polymer serving as an essential component for the binder of the present invention is hereinafter sometimes referred to as "polymer of the present invention."

In the general formula (1), $R_1$ represents a hydrogen atom or a methyl group, and $R_2$ represents an organic group having 2 to 20 carbon atoms.

An upper limit for the number of carbon atoms in $R_2$ in the general formula (1) is preferably 12 or less, more preferably 8 or less, particularly preferably 4 or less.

Examples of $R_2$ in the general formula (1) include a substituted or unsubstituted alkylene group, a substituted or unsubstituted arylene group, and a substituted or unsubstituted ether group.

The substituted alkylene group refers to such a group that part or all of hydrogen atoms constituting an alkylene group are each substituted with a substituent. Here, the substituent is, for example, an aryl group, a hydroxyl group, an alkoxy group, an amino group, an ester group, an amide group, a carboxyl group, or a sulfonic acid group.

The substituted arylene group refers to such a group that part or all of hydrogen atoms constituting an arylene group are each substituted with a substituent. Here, the substituent is, for example, an alkyl group, a hydroxyl group, an alkoxy group, an amino group, an ester group, an amide group, a carboxyl group, or a sulfonic acid group.

The ether group includes a polyether group, and the substituted ether group refers to such a group that part or all of hydrogen atoms constituting an ether group are each substituted with a substituent. Here, the substituent is, for example, an alkyl group, an aryl group, a hydroxyl group, an amino group, an ester group, an amide group, a carboxyl group, or a sulfonic acid group.

Specific examples of $R_2$ in the general formula (1) include: alkylene groups, such as a —$CH_2CH_2$— group, a —$CH(CH_3)CH_2$— group, a —$CH_2CH(CH_3)$— group, a —$C(CH_3)_2$— group, a —$CH_2CH_2CH_2$— group, a —$CH(C_2H_5)CH_2$— group, a —$C(C_2H_5)(CH_3)$— group, a —$CH_2CH_2CH_2CH_2$— group, and a —$CH(C_4H_9)CH_2$— group; arylene groups, such as a phenylene group and a naphthyl group; and ether groups, such as a —$CH_2CH_2OCH_2CH_2$— group, a —$CH_2CH_2OCH_2CH_2OCH_2CH_2$— group, a —$CH_2CH_2OCH_2CH_2OCH_2CH_2OCH_2CH_2$— group, a —$CH(CH_3)$ $CH_2OCH(CH_3)CH_2$— group, and a —$CH(CH_3)$ $CH_2OCH(CH_3)$ $CH_2OCH(CH_3)$ $CH_2$— group.

The total number of carbon atoms in $R_1$ and $R_2$ is preferably 3 or more because the following tendency is observed: the strength of a bonded body (referring to a glass fiber, powdered glass, or the like treated with the binder of the present invention) in the case where the binder of the present invention is used as a binder for a glass fiber or powdered glass is improved, and its deterioration due to moisture absorption can be suppressed.

In the present invention, the term "structural unit derived from a monomer represented by the general formula (1)" means a structural unit formed by the polymerization of the monomer represented by the general formula (1). However, a structural unit obtained by a method except the polymerization of the monomer represented by the general formula (1) is also included in the "structural unit derived from the monomer represented by the general formula (1)" as long as the structural unit is of the same structure as that of the structural unit formed by the polymerization of the monomer represented by the general formula (1).

The structural unit derived from the monomer represented by the general formula (1) can be represented by the following general formula (2).

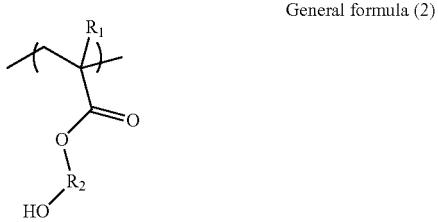

General formula (2)

In the general formula (2), $R_1$ represents a hydrogen atom or a methyl group, and $R_2$ represents an organic group having 2 to 20 carbon atoms. Modes and preferred modes of $R_1$ and $R_2$ in the general formula (2) are the same as the modes and preferred modes of $R_1$ and $R_2$ in the general formula (1).

The polymer of the present invention contains the structural unit derived from the monomer represented by the general formula (1) at a content of preferably 5 mol % or more and 40 mol % or less, more preferably 10 mol % or more and 35 mol % or less, still more preferably 15 mol % or more and 30 mol % or less with respect to 100 mol % of structural units derived from all monomers (the structural unit derived from the monomer represented by the general formula (1), a structural unit derived from a monomer containing a carboxylic acid (salt) group to be described later, and a structural unit derived from any other monomer). When the polymer contains the structural unit at a content within the range, the strength of a bonded body in the case where the binder of the present invention is used as a binder for a glass fiber or powdered glass tends to be improved.

The polymer of the present invention may contain one kind of structural unit derived from the monomer represented by the general formula (1), or may contain two or more kinds of such structural units.

The polymer of the present invention includes a structural unit derived from a monomer containing a carboxylic acid (salt) group. The monomer containing a carboxylic acid (salt) group refers to a monomer containing a carboxyl group and/or a salt thereof and a polymerizable carbon-carbon double bond (excluding the monomer represented by the general formula (1)), and specific examples thereof include unsaturated monocarboxylic acids, such as acrylic acid, methacrylic acid, crotonic acid, α-hydroxyacrylic acid, α-hydroxymethylacrylic acid, and derivatives thereof, and salts thereof; and unsaturated dicarboxylic acids, such as fumaric acid, maleic acid, methylene glutaric acid, and itaconic acid, and salts (which may be monosalts or disalts) thereof.

Examples of the salt include a metal salt, an ammonium salt, and an organic amine salt. Examples of the metal salt include salts of: an alkali metal, such as sodium or potassium; an alkaline earth metal, such as calcium or magnesium; and a transition metal, such as iron or aluminum. Examples of the organic amine salt include salts of: an alkylamine, such as methylamine or n-butylamine; an alkanolamine, such as monoethanolamine, diethanolamine, triethanolamine, or dipropanolamine; and a polyamine, such as ethylenediamine or diethylenetriamine.

In the present invention, the structural unit derived from the monomer containing a carboxylic acid (salt) group is a structural unit formed by the polymerization of the monomer containing a carboxylic acid (salt) group, and is specifically a structure in which a carbon-carbon double bond of the monomer containing a carboxylic acid (salt) group is turned into a single bond. For example, when the monomer containing a carboxylic acid (salt) group is acrylic acid ($CH_2$=CHCOOH), the structural unit derived from the monomer containing a carboxylic acid (salt) group can be represented by "—$CH_2$—CH(COOH)—."

The polymer of the present invention contains the structural unit derived from the monomer containing a carboxylic acid (salt) group at a content of preferably 60 mol % or more and 95 mol % or less, more preferably 65 mol % or more and 90 mol % or less, still more preferably 70 mol % or more and 85 mol % or less with respect to 100 mol % of the structural units derived from all the monomers. The polymer of the present invention may contain one kind of structural unit derived from the monomer containing a carboxylic acid (salt) group, or may contain two or more kinds of such structural units. When the polymer contains the structural unit derived from the monomer containing a carboxylic acid (salt) group at a content within the range, the strength of a bonded body in the case where the binder of the present invention is used as a binder for a glass fiber or powdered glass tends to be improved.

At this time, the polymer of the present invention contains a carboxylicacid (salt) group. Here, 2 mol % or more of the carboxylic acid (salt) groups in the polymer molecules of the polymer of the present invention are neutralized with a volatile base and/or a nonvolatile base. That is, 2 mol % or more with respect to 100 mol % of the carboxylic acid (salt) groups in the polymer of the present invention are carboxylic acid salt groups neutralized with the volatile base or the nonvolatile base. Preferably 2 mol % or more and 100 mol % or less, more preferably 5 mol % or more and 99 mol % or less, still more preferably 8 mol % or more and 98 mol % or less, even still more preferably 10 mol % or more and 93 mol % or less, particularly preferably 15 mol % or more and 88 mol % or less of the carboxylic acid (salt) groups in the polymer molecules are neutralized with the volatile base and/or the nonvolatile base. When the groups are neutralized at a ratio within the range, the storage stability of the binder of the present invention tends to be satisfactory, and the strength of a glass fiber or powdered glass treated with the binder of the present invention tends to be satisfactory.

In the present invention, the volatile base refers to a base having a boiling point at one atmospheric pressure of less than 100° C. In the present invention, the nonvolatile base refers to a base having a boiling point at one atmospheric pressure of 100° C. or more. Examples of the volatile base include ammonia, monomethylamine, dimethylamine, trimethylamine, isopropylamine, n-butylamine, and triethylamine. The volatile bases may be used alone, or in combination thereof. Examples of the nonvolatile base include: hydroxides of alkali metals, such as sodium hydroxide and potassium hydroxide; hydroxides of alkaline earth metals, such as calcium hydroxide; carbonates of alkali metals, such as sodium hydrogen carbonate and sodium carbonate; alkanolamines, such as monoethanolamine and diethanolamine; tributylamine; and cyclohexylamine. The nonvolatile bases may be used alone, or in combination thereof. A carboxylic acid salt group neutralized with the volatile base is, for example, —COONH$_4$, which is particularly preferred, and a carboxylic acid salt group neutralized with the nonvolatile base is, for example, —COONa, —COOK, or —COONH$_2$(CH$_2$CH$_2$OH)$_2$, which is particularly preferred. The carboxylic acid salt groups of the polymer of the present invention may be neutralized with one kind of base (the volatile base or the nonvolatile base), or may be neutralized with two or more kinds of bases (the volatile bases and/or the nonvolatile bases).

In the polymer of the present invention, 0 mol % to 35 mol % of the carboxylic acid (salt) groups in the polymer are preferably neutralized with the nonvolatile base (that is, 0 mol % to 35 mol % with respect to 100 mol % of the carboxylic acid (salt) groups in the polymer of the present invention are preferably neutralized with the nonvolatile base), 0 mol % to 30 mol % thereof are more preferably neutralized with the nonvolatile base, and 0 mol % to 20 mol % thereof are still more preferably neutralized with the nonvolatile base.

In the polymer of the present invention, 0 mol % to 100 mol % of the carboxylic acid (salt) groups in the polymer are preferably neutralized with the volatile base (that is, 0 mol % to 100 mol % with respect to 100 mol % of the carboxylic acid (salt) groups in the polymer of the present invention are preferably neutralized with the volatile base), 0 mol % to 99 mol % thereof are more preferably neutralized with the volatile base, 0 mol % to 98 mol % thereof are still more preferably neutralized with the volatile base, 0 mol % to 93 mol % thereof are still further more preferably neutralized with the volatile base, and 0 mol % to 88 mol % thereof are particularly preferably neutralized with the volatile base.

The polymer of the present invention may contain a structural unit derived from a monomer except the monomer represented by the general formula (1) and the monomer containing a carboxylic acid (salt) group (hereinafter sometimes referred to as "other monomer"). The other monomer is not particularly limited, and specific examples thereof include: sulfonic acid-based monomers, such as 3-allyloxy-2-hydroxypropanesulfonic acid, (meth)allylsulfonic acid, isoprenesulfonic acid, vinylsulfonic acid, styrenesulfonic acid, and salts thereof; amino group-containing monomers, such as vinylpyridine, vinylimidazole, dimethylaminoethyl acrylate, dimethylaminoethyl methacrylate, dimethylaminopropyl acrylate, aminoethyl methacrylate, diallylamine, diallyldimethylamine, and quaternized products thereof and salts thereof; N-vinyl monomers, such as N-vinylpyrrolidone, N-vinylformamide, N-vinylacetamide, N-vinyl-N-methylformamide, N-vinyl-N-methylacetamide, and N-vinyloxazolidone; amide-based monomers, such as (meth)acrylamide, N,N-dimethylacrylamide, and N-isopropylacrylamide; unsaturated alcohol-based monomers, such as 3-(meth)allyloxy-1,2-dihydroxypropane, 3-allyloxy-1,2-dihydroxypropane, (meth)allyl alcohol, and isoprenol; polyalkylene glycol-based monomers each having a structure in which an alkylene oxide is added to the unsaturated alcohol-based monomer; (meth)acrylic acid alkyl ester-based monomers, such as butyl (meth)acrylate, 2-ethylhexyl (meth)acrylate, and dodecyl (meth)acrylate; unsaturated glycidyl compounds, such as (meth)allyl glycidyl ether and glycidyl (meth)acrylate; monomers each having a structure in which an alcohol is added to the unsaturated glycidyl compound, such as l-allyloxy-3-butoxypropan-2-ol; vinyl aryl monomers, such as styrene, indene, and vinyl aniline; alkenes, such as isobutylene and octene; and vinyl carboxylates, such as vinyl acetate and vinyl propionate. In addition, when the other monomer is used, the monomers may be used alone, or in combination thereof.

Examples of the salts include the same salts as the salts in the monomer containing a carboxylic acid (salt) group.

In the present invention, the structural unit derived from the other monomer is a structural unit formed by the polymerization of the other monomer, and is specifically a structure in which a carbon-carbon double bond of the other monomer is turned into a single bond. For example, when the other monomer is butyl acrylate (CH$_2$=CHCOOC$_4$H$_9$), the structural unit derived from the other monomer can be represented by "—CH$_2$—CH(COOC$_4$H$_9$)—."

The polymer of the present invention contains preferably 0 mol % or more and 35 mol % or less, more preferably 0 mol % or more and 25 mol % or less, still more preferably 0 mol % or more and 15 mol % or less of the structural unit derived from the other monomer with respect to 100 mol % of the structural units derived from all the monomers. The polymer of the present invention may contain one kind of structural unit derived from the other monomer, or may contain two or more kinds of such structural units.

The respective structural units in the polymer of the present invention may be present at random, or may be present regularly, for example, in a block manner.

The weight-average molecular weight of the polymer of the present invention is preferably 500 or more and 100,000 or less, more preferably 1,500 or more and 15,000 or less, still more preferably 2,000 or more and 10,000 or less because the following tendency is observed: the strength of a bonded body in the case where the binder of the present invention is used as a binder for a glass fiber or powdered glass is improved, and its deterioration due to moisture absorption can be suppressed. The weight-average molecular weight can be measured by a measurement method to be described later.

The polymer of the present invention is preferably produced by a method including a step of polymerizing the monomer represented by the general formula (1), the monomer containing a carboxylic acid (salt) group, and as required, the other monomer. In the step, the usage amount of the monomer represented by the general formula (1) is set to preferably from 5 mol % to 40 mol %, more preferably from 10 mol % to 35 mol %, still more preferably from 15 mol % to 30 mol % with respect to 100 mol % of the total usage amount of the monomer represented by the general formula (1), the monomer containing a carboxylic acid (salt) group, and the other monomer (the monomers are hereinafter sometimes referred to as "all the monomers"). The usage amount of the monomer containing a carboxylic acid (salt) group in the step is preferably from 60 mol % to 95 mol %, more preferably from 65 mol % to 90 mol %, still more preferably from 70 mol % to 85 mol % with respect to 100 mol % of the total usage amount of all the monomers. The usage amount of the other monomer in the step is preferably from 0 mol % to 35 mol %, more preferably from 0 mol % to 25 mol %, still more preferably from 0 mol % to 15 mol % with respect to 100 mol % of the total usage amount of all the monomers.

Conventionally known various methods, such as a solution polymerization method, a bulk polymerization method, a suspension polymerization method, a reverse phase suspension polymerization method, a cast polymerization method, a thin-film polymerization method, and a spray polymerization method, can each be adopted for the polymerization in the polymerizing step. Of those, a solution polymerization method is preferred, though the method for the polymerization is not particularly limited. In addition, the polymerizing step can be performed in a batch manner or in a continuous manner.

A polymerization initiator is preferably used when the polymerization is performed in the polymerizing step. Suitable examples of the polymerization initiator include: hydrogen peroxide; persulfates, such as sodium persulfate, potassium persulfate, and ammonium persulfate; azo-based compounds, such as dimethyl 2,2'-azobis(2-methyl propionate), 2,2'-azobis(isobutyronitrile), 2,2'-azobis(2-methyl-propionamidine) dihydrochloride, 2,2'-azobis[N-(2-carboxyethyl)-2-methylpropionamidine] hydrate, 2,2'-azobis [2-(2-imidazolin-2-yl)propane], and 2,2'-azobis(1-imino-1-pyrrolidino-2-methylpropane) dihydrochloride; and organic peroxides, such as benzoyl peroxide, lauroyl peroxide, peracetic acid, di-t-butyl peroxide, and cumene hydroperoxide. Of those polymerization initiators, hydrogen peroxide and persulfates are preferred, and persulfates are most preferred. Those polymerization initiators may be used alone, or in the form of a mixture thereof.

The usage amount of the polymerization initiator is preferably 0.1 g or more and 10 g or less, more preferably 0.1 g or more and 7 g or less, still more preferably 0.1 g or more and 5 g or less with respect to 1 mol of the usage amount of the monomers (all the monomers).

A chain transfer agent may be used as required in the polymerizing step. Specific examples of the chain transfer agent include: thiol-based chain transfer agents, such as mercaptoethanol, thioglycolic acid, mercaptopropionic acid, and n-dodecyl mercaptan; halogenated products, such as carbon tetrachloride, methylene chloride, bromoform, and bromotrichloroethane; secondary alcohols, such as isopropanol and glycerin; hypophosphorous acid (salts), such as hypophosphorous acid and sodium hypophosphite (including hydrates thereof); phosphorous acid (salts), such as phosphorous acid and sodium phosphite; sulfurous acid (salts), such as sodium sulfite and potassium sulfite; bisulfurous acid (salts), such as sodium hydrogen sulfite and potassium hydrogen sulfite; dithionous acid (salts), such as sodium dithionate; and pyrosulfurous acid (salts), such as potassium pyrosulfite. The chain transfer agents may be used alone, or in the form of a mixture thereof.

The usage amount of the chain transfer agent is preferably 0 g or more and 20 g or less, more preferably 1 g or more and 15 g or less, still more preferably 1 g or more and 10 g or less with respect to 1 mol of the usage amount of the monomers (all the monomers).

A heavy metal ion may be used in the polymerizing step for the purpose of, for example, accelerating the reaction. In the present invention, the heavy metal ion means an ion of a metal having a specific gravity of 4 $g/cm^3$ or more. The use of the heavy metal ion can reduce the usage amount of the polymerization initiator. The heavy metal ion is not particularly limited as long as a heavy metal is present in the form of an ion. However, a method including using a solution obtained by dissolving a heavy metal compound is suitably used because the solution is excellent in handleability. Examples of the heavy metal compound include Mohr's salt $(Fe(NH_4)_2(SO_4)_2 \cdot 6H_2O)$, ferrous sulfate heptahydrate, ferrous chloride, ferric chloride, and manganese chloride.

The usage amount of the heavy metal ion is preferably 0 ppm or more and 100 ppm or less, more preferably 0 ppm or more and 50 ppm or less with respect to the total amount of a polymerization reaction liquid.

A solvent is preferably used in the polymerizing step. The solvent preferably contains water, and contains water at a content of more preferably 50 mass % or more and 100 mass % or less, still more preferably 80 mass % or more and 100 mass % or less with respect to the total amount of the solvent. Examples of the solvent that can be used in the polymerizing step include: water; lower alcohols, such as methanol, ethanol, and isopropyl alcohol; lower ketones, such as acetone, methyl ethyl ketone, and diethyl ketone; ethers, such as dimethyl ether and dioxane; and amides, such as dimethylformamide. Those solvents may be used alone, or in the form of a mixture thereof.

The usage amount of the solvent is preferably from 40 mass % to 200 mass % with respect to 100 mass % of the monomers. The usage amount is more preferably 45 mass % or more, still more preferably 50 mass % or more. In addition, the usage amount is more preferably 180 mass % or less, still more preferably 150 mass % or less. When the usage amount of the solvent is less than 40 mass %, the molecular weight of a polymer to be obtained may increase, and when the usage amount is more than 200 mass %, the concentration of the polymer to be obtained may reduce to cause an increase in cost for its storage or the like.

In ordinary cases, the polymerization in the polymerizing step is preferably performed at 0° C. or more, and is preferably performed at 150° C. or less. The polymerization is performed at more preferably 40° C. or more, still more preferably 60° C. or more, particularly preferably 80° C. or more. In addition, the polymerization is performed at more preferably 120° C. or less, still more preferably 110° C. or less.

There is no need to maintain the polymerization temperature at a substantially constant value at all times in the polymerization reaction. For example, the following may be performed: the polymerization is initiated at room temperature, the temperature is increased to a preset temperature for a proper temperature increase time or at a proper rate of temperature increase, and then the preset temperature is maintained. Alternatively, the temperature may be fluctuated (increased or decreased) with time during the polymerization reaction in accordance with a method of dropping, for example, a monomer component or the initiator.

A polymerization time in the polymerizing step, which is not particularly limited, is preferably from 30 minutes to 420 minutes, more preferably from 45 minutes to 390 minutes, still more preferably from 60 minutes to 360 minutes, most preferably from 90 minutes to 300 minutes. Unless otherwise stated, in the present invention, when the polymerization is performed in a batch manner, the term "polymerization time" refers to the time period for which the monomers are added.

In the polymerizing step, acid groups in the monomer during the polymerization may not be neutralized, or part or all of the groups may be neutralized. However, it is preferred that the ratio of carboxylic acid salt groups neutralized with the nonvolatile base and the ratio of carboxylic acid salt groups neutralized with the volatile base be from 0 mol % to 35 mol % and from 0 mol % to 100 mol %, respectively with respect to 100 mol % of the carboxylic acid (salt) groups of the monomer containing a carboxylic acid (salt) group because the neutralization ratio of the carboxylic acid (salt) groups of the polymer of the present invention in the binder can be easily adjusted within the above-mentioned range. The following is also permitted: the polymerizing step is performed at a low neutralization ratio (including a neutralization ratio of 0 mol %) and the neutralization ratio is adjusted to a desired value in a neutralizing step.

A pressure in a reaction system in the polymerizing step may be any one of normal pressure (atmospheric pressure), reduced pressure, and increased pressure. However, in terms of the molecular weight of the polymer to be obtained, the polymerization is preferably performed under normal pressure or under increased pressure by hermetically sealing the inside of the reaction system. In addition, the polymerization is preferably performed under normal pressure (atmospheric pressure) in terms of facilities, such as a pressure apparatus, a decompression apparatus, a pressure-resistant reaction vessel, and piping. An atmosphere in the reaction system may be an air atmosphere or an inert atmosphere, and for example, air in the system may be replaced with an inert gas, such as nitrogen, before the initiation of the polymerization.

The polymer of the present invention may be produced by a method including a step except the polymerizing step, though the step is optional. Examples of the step include an aging step, a neutralizing step, a step of deactivating the polymerization initiator or the chain transfer agent, a diluting step, a drying step, a concentrating step, and a purifying step.

[Binder of the Present Invention]

The binder of the present invention necessarily contains the polymer of the present invention and the ammonium salt of the inorganic acid.

The binder of the present invention contains the polymer of the present invention and the ammonium salt of the inorganic acid at a content of preferably from 1 mass % to 100 mass %, more preferably from 10 mass % to 97 mass %, still more preferably from 30 mass % to 95 mass % in total with respect to 100 mass % of the binder of the present invention. When the binder contains the polymer and the ammonium salt of the inorganic acid at a content within the range, the strength of a bonded body with a glass fiber or powdered glass tends to be further improved.

Examples of the ammonium salt of the inorganic acid include ammonium sulfate, ammonium phosphate, ammonium phosphite, ammonium hypophosphite, and ammonium nitrate. The ammonium salt of the inorganic acid is preferably an ammonium salt of an acid stronger than acrylic acid.

Although the reason why the incorporation of the ammonium salt of the inorganic acid improves the strength of the bonded body of the glass fiber or the powdered glass treated with the binder of the present invention is unclear, the reason is assumed to be as described below. In the treatment with the binder (preferably under a heating condition), (1) ammonia is volatilized from the ammonium salt of the inorganic acid and hence the inorganic acid is produced. (2) The inorganic acid reacts with a carboxyl base of the polymer of the present invention to produce an inorganic acid salt, and the carboxylic acid salt groups of the polymer of the present invention become unneutralized carboxylic acid groups. When the inorganic acid salt is the ammonium salt of the inorganic acid, the (1) and the (2) are further repeated. (3) The unneutralized carboxylic acid groups in the polymer of the present invention react with, for example, hydroxyl groups in the polymer of the present invention or the hydroxyl groups of a cross-linking agent more easily than the carboxylic acid salt groups do, and hence a crosslinking reaction is accelerated to improve the strength of the bonded body.

The binder of the present invention contains the ammonium salt of the inorganic acid at a content of preferably 0.1 mol % or more and 20 mol % or less, more preferably 0.5 mol % or more and 15 mol % or less, still more preferably 1.0 mol % or more and 12 mol % or less with respect to 100 mol % of carboxyl groups in the polymer of the present invention.

Although the binder of the present invention is preferably produced by mixing the polymer of the present invention and the ammonium salt of the inorganic acid, and as required, any other component, the binder of the present invention can be produced by any appropriate method. For example, the binder of the present invention may be produced simultaneously with the polymer of the present invention by mixing raw materials for the polymer of the present invention with the ammonium salt of the inorganic acid in advance.

Although the binder of the present invention may contain only the polymer of the present invention and the ammonium salt of the inorganic acid, the binder of the present invention may contain a phosphorus-containing compound because the mechanical strength of a bonded body in the case where the binder of the present invention is used as a binder for a glass fiber or powdered glass tends to be further improved. The phosphorus-containing compound may have an accelerating effect on the cross-linking of the polymer of the present invention.

Examples of the phosphorus-containing compound include: acid group-containing compounds, such as hypophosphorous acid (salts), phosphorous acid (salts), phosphoric acid (salts), pyrophosphoric acid (salts), polyphosphoric acid (salts), and organic phosphoric acid (salts) (including hydrates thereof); and organic phosphorus compounds, such as trimethylphosphine, triphenylphosphine, and triphenylphosphine oxide. When the binder of the present invention contains the phosphorus-containing compound, the binder may contain one kind of those compounds, or may contain two or more kinds thereof. Examples of the salts include those described above. The content of the phosphorus-containing compound in the binder of the present invention can be set to preferably from 0 mass % to 20 mass %, more preferably from 0.1 mass % to 10 mass %, still more preferably from 0.5 mass % to 7 mass % with respect to 100 mass % of the polymer (polymer of the present invention) in the binder of the present invention.

The binder of the present invention may contain a curing accelerator except the phosphorus-containing compound. Examples of the curing accelerator except the phosphorus-containing compound include: protonic acids (e.g., sulfuric acid, a carboxylic acid, and carbonic acid), and salts thereof (e.g., metal (e.g., alkali metals, alkaline earth metals, transition metals, Group 2B metals, Group 4A metals, Group 4B metals, and Group 5B metals) salts and ammonium salts); and oxides, chlorides, hydroxides, and alkoxides of the metals (described above). Those curing accelerators may be used alone, or in combination thereof. The binder of the present invention may contain the curing accelerator except the phosphorus-containing compound at a content of, for example, from 0 mass % to 20 mass %.

The binder of the present invention may contain a solvent. Although the solvent may be an organic solvent, the binder preferably contains water, and water preferably accounts for 50 mass % or more of the total amount of the solvent.

The binder of the present invention contains the solvent at a content of preferably from 0 mass % to 99 mass %, more preferably from 3 mass % to 95 mass %, still more preferably from 5 mass % to 90 mass % with respect to 100 mass % of the binder of the present invention.

The binder of the present invention may contain a cross-linking agent because the mechanical strength of a bonded body in the case where the binder of the present invention is used as a binder for a glass fiber or powdered glass tends to be further improved, though the cross-linking agent is optional.

The molecular weight of the cross-linking agent is preferably 1,000 or less, more preferably 500 or less, particularly preferably 300 or less because the strength of a bonded body with a glass fiber or powdered glass tends to be further improved. The cross-linking agent is, for example, a compound having two or more hydroxyl groups and/or two or more amino groups in a molecule thereof. Preferred examples of the cross-linking agent include: dihydric alcohols (alcohols each having two hydroxyl groups in a molecule thereof), such as ethylene glycol, propylene glycol, butylene glycol, diethylene glycol, triethylene glycol, and a polyalkylene glycol; trihydric or higher alcohols (alcohols each having three or more hydroxyl groups in a molecule thereof), such as glycerin, polyglycerin, erythritol, xylitol, and sorbitol; alkanolamines, such as monoethanolamine, diethanolamine, and triethanolamine; polyamines, such as ethylenediamine and diethylenetriamine; and polyols produced by adding alkylene oxides to the polyamines.

The binder of the present invention contains the cross-linking agent at a content of preferably from 0 mol % to 50 mol %, more preferably from 0 mol % to 45 mol %, particularly preferably from 0 mol % to 40 mol % with respect to 100 mol % of the acid groups in the polymer (polymer of the present invention) in the binder of the present invention.

[Applications of Binder of the Present Invention]

The binder of the present invention can be used as a binder for: an inorganic fiber, such as a glass fiber, rock wool, or a carbon fiber; an inorganic particle (inorganic powder), such as a glass particle or a mineral particle; a fiber of organic matter, such as wool, cellulose, hemp, nylon, or polyester; a particle of organic matter (powder of organic matter), such as a nylon fine particle or a polyester fine particle; or the like. The binder can be preferably used as a binder for a glass fiber or powdered glass.

[Usage Method for Binder of the Present Invention]

A treatment with the binder of the present invention necessarily includes a step of bringing the binder of the present invention into contact with an object substance (substance to be bonded), such as a glass fiber or powdered glass. When the binder of the present invention contains the solvent, the step is preferably performed by (i) impregnating the substance to be bonded with the binder of the present invention or (ii) spreading the binder of the present invention on the substance to be bonded while the binder is used as it is or after its concentration or the like has been regulated as desired. When the binder of the present invention is free of any solvent, the binder of the present invention may be brought into contact with the substance to be bonded after having been heated and melted, but unevenness tends to be liable to occur in the strength of a treated product (bonded body). Accordingly, The (i) or the (ii) is preferably performed after a component for the binder has been dissolved in the solvent. Of those, the (ii) is preferred because the addition amount of the binder of the present invention with respect to the substance to be bonded can be easily regulated.

The addition amount of the binder of the present invention with respect to the substance to be bonded in the step of bringing the binder of the present invention into contact with the substance to be bonded is as follows: the solid content of the binder of the present invention is preferably from 1 mass % to 40 mass %, more preferably from 1 mass % to 30 mass %, still more preferably from 1 mass % to 15 mass % with respect to 100 mass % of the substance to be bonded. When the binder of the present invention is used in an amount within the range, the mechanical strength of the bonded body tends to be improved. The phrase "addition amount of the binder of the present invention with respect to the substance to be bonded in the step of bringing the binder of the present invention into contact with the substance to be bonded" refers to the amount of the binder that actually adheres to the substance to be bonded after the impregnation of the substance to be bonded in the step (i), and refers to the amount of the binder that actually adheres to the substance to be bonded after its spread on the substance to be bonded in the step (ii).

The treatment with the binder of the present invention preferably includes a step of heat-treating the bonded body obtained in the step of bringing the binder into contact with the substance to be bonded. The performance of the heat treatment tends to accelerate a cross-linking reaction to improve the strength of the bonded body.

The heat treatment step is performed at preferably from 100° C. to 400° C., more preferably from 120° C. to 350° C., still more preferably from 150° C. to 300° C.

When the binder of the present invention contains the solvent, the treatment with the binder of the present invention may include a step of drying the bonded body obtained in the step of bringing the binder into contact with the substance to be bonded. The drying step may be performed under normal pressure, or may be performed under reduced pressure. When the drying is performed under heating, a condition therefor is identical to that for the heat treatment step.

When the binder of the present invention contains the solvent, the treatment with the binder of the present invention may include a step of curing the bonded body obtained in the step of bringing the binder into contact with the substance to be bonded.

[Glass Fiber Bonded Body of the Present Invention or Powdered Glass Bonded Body of the Present Invention]

A glass fiber bonded body of the present invention or a powdered glass bonded body of the present invention can be produced by treating a glass fiber and/or glass powder with the binder of the present invention according to, for example, the method described in the section "Usage Method for Binder of the Present Invention" (also referred to as "production method I").

The glass fiber bonded body of the present invention or the powdered glass bonded body of the present invention may be produced by a method including: a step (step iii) of bringing one of the polymer of the present invention (that may contain the ammonium salt of the inorganic acid, or may be free of the salt) and the ammonium salt of the inorganic acid into contact with the glass fiber and/or the glass powder first; and a step (step iv) of bringing the remaining one into contact with a composition obtained in the step iii (also referred to as "production method II"). In the production method II, with regard to a ratio between the polymer of the present invention and the ammonium salt of the inorganic acid added in the step iii and the step iv, a molar ratio between the carboxyl groups in the polymer of the present invention and the ammonium salt of the inorganic acid is preferably from 100 mol:0.1 mol to 100 mol:20 mol, more preferably from 100 mol:0.5 mol to 100 mol:15 mol, still more preferably from 100 mol:1.0 mol to 100 mol:12 mol.

The production method II may include any appropriate step, such as a step of heat-treating the bonded body obtained in the step iv, a step of drying the bonded body, or a step of curing the bonded body. Conditions for the heat treatment step, the drying step, and the curing step are the same as the conditions described in the section "Usage Method for Binder of the Present Invention."

[Aqueous Solution of the Present Invention]

The binder of the present invention is applicable to an application except a binder because the binder of the present invention has satisfactory storage stability. For example, the binder is applicable to various aqueous applications.

An aqueous solution containing a polymer having a hydroxyl group and an ammonium salt of an inorganic acid, the aqueous solution having the following features (also referred to as "aqueous solution of the present invention"), is also a preferred mode of the present invention: the polymer contains a structural unit derived from a monomer represented by the following general formula (1) and a structural unit derived from a monomer containing a carboxylic acid (salt) group; the content of the structural unit derived from the monomer represented by the general formula (1) is from 5 mol % to 40 mol % with respect to 100 mol % of structural units derived from all monomers; the content of the structural unit derived from the monomer containing a carboxylic acid (salt) group is from 60 mol % to 95 mol % with respect to 100 mol % of the structural units derived from all the monomers; 2 mol % or more of the carboxylic acid (salt) groups in the polymer are neutralized with a volatile base and/or a nonvolatile base; 0 mol % to 35 mol % of the carboxylic acid (salt) groups in the polymer are neutralized with the nonvolatile base; 0 mol % to 100 mol % of the carboxylic acid (salt) groups in the polymer are neutralized with the volatile base; and the aqueous solution contains 20 mass % or more and 99.9 mass % or less of water. A preferred mode of the aqueous solution of the present invention is the same as that of the binder of the present invention unless otherwise stated.

EXAMPLES

The present invention is described in more detail below by way of Examples, but the present invention is not limited only to these Examples.

<Measurement Conditions for Weight-Average Molecular Weight>

A weight-average molecular weight was measured under the following conditions.
Apparatus: HLC-8320GPC manufactured by Tosoh Corporation
Detector: RI
Column: TSK-GEL G3000PWXL manufactured by Tosoh Corporation
Column temperature: 35° C.
Flow rate: 0.5 ml/min
Calibration curve: POLY SODIUM ACRYLATE STANDARD manufactured by Sowa Science Corporation
Eluent: solution obtained by diluting a mixture of sodium dihydrogen phosphate dodecahydrate/disodium hydrogen phosphate dihydrate (34.5 g/46.2 g) with pure water to 5,000 g <Method of Measuring Solid Content of Aqueous Solution after Completion of Polymerization>

A binder was subjected to a drying treatment by being left to stand in an oven heated to 150° C. for 60 minutes. The solid content (%) of an aqueous solution after the completion of polymerization was calculated from a change between weights before and after the drying.

<Effective Component of Binder>

The effective component of the binder was calculated from the solid content of the aqueous solution after the completion of the polymerization, and the addition amounts of pure water, a phosphorus-containing compound, an ammonium salt of an inorganic acid, and a base added to the polymer aqueous solution. The term "effective component" as used herein refers to the total amount of the polymer and the phosphorus-containing compound. However, when neutralization was performed with the volatile base, the effective component was calculated on the assumption that all salts of carboxyl groups of the volatile base were carboxylic acid groups because the base volatilized at the time of curing.

<Analysis of Content of Phosphorus-Containing Compound (Ion Chromatography Analysis)>

The content of the phosphorus-containing compound was analyzed by ion chromatography under the following conditions.
Apparatus: 762 Interface manufactured by Metrohm
Detector: 732 IC Detector manufactured by Metrohm
Ion analysis method: suppressor method
Column: Shodex IC SI-90 4E
Guard column: Shodex SI-90 G
Column temperature: 40° C.
Eluent: $NaHCO_3$ aqueous solution (obtained by diluting 2 g of $NaHCO_3$ with water to 2,000 g)
Flow rate: 1.0 mL/min <Production of Binder Cured Product Test Piece>

A binder cured product test piece was produced as described below.
(i) Pure water was added to the binder to adjust its effective component to 35%.
(ii) The binder obtained in the (i) was added to glass beads each having a particle diameter of from 0.35 mm to 0.50 mm so that the effective component accounted for 7.5% of the weight of the glass beads, followed by sufficient mixing.

(iii) The mixture obtained in the (ii) was forced into a mold measuring 140 mm by 20 mm by 5 mm, which had been subjected to a release treatment, and was molded, followed by drying in an oven at 215° C. for 60 minutes. After that, the resultant was transferred to a desiccator and cooled for 30 minutes to provide the test piece.
<Mechanical Strength of Test Piece>

A bending strength was measured in conformity with JIS K 7171 at a test speed of 2 mm/min. The bending strengths of three test pieces were measured, and their average was calculated.
<Method of Evaluating Hydrolysis Resistance>

The binder cured product test piece obtained by the above-mentioned method was left at rest in a thermohygrostat at 60° C. and 80% RH for 150 minutes. After that, the test piece was removed, and was dried at 23° C. and 50% RH for 1 hour. The mechanical strength of the test piece after the drying was measured, and its hydrolysis resistance was evaluated on the basis of the retention ratio of the strength.

Production Example 1

384.9 Grams of pure water was loaded (initial loading) into a SUS separable flask having a volume of 2.5 liters, the flask including a reflux condenser, a stirrer (paddle blade), and a temperature gauge, and its temperature was increased to its boiling point under stirring. Next, under stirring, 669.3 g (i.e., 7.44 mol) of an 80 mass % aqueous solution of acrylic acid (hereinafter referred to as "80% AA") was dropped for 180 minutes into a polymerization reaction system in a boiling point reflux state, 241.7 g (i.e., 1.86 mol) of hydroxyethyl methacrylate (hereinafter referred to as "HEMA") was dropped for 180 minutes thereinto, and 46.6 g of a 15 mass % aqueous solution of sodium persulfate (hereinafter referred to as "15% NaPS") was dropped for 195 minutes thereinto. A 45 mass % aqueous solution of sodium hypophosphite (hereinafter referred to as "45% SHP") was also dropped in two stages at the following supply rates thereinto under stirring: 32.0 g thereof was dropped for 18 minutes, and subsequently 125.5 g thereof was dropped for 162 minutes. The respective components were dropped from a tip nozzle through supply paths different from one another. Each of the components except the 45% SHP was continuously dropped at a constant dropping rate. After the completion of the dropping of the 80% AA, polymerization was completed by further maintaining (aging) a reaction solution in the boiling point reflux state over 30 minutes. The resultant polymer aqueous solution (1) had a solid content of 57.0% and a weight-average molecular weight (Mw) of 3,500, and the content of SHP was 1.0 mass % with respect to 100 mass % of the polymer.

Production Example 2

127.6 Grams of pure water was loaded (initial loading) into a SUS separable flask having a volume of 2.5 liters, the flask including a reflux condenser, a stirrer (paddle blade), and a temperature gauge, and its temperature was increased to its boiling point under stirring. Next, under stirring, 610.6 g (i.e., 6.78 mol) of 80% AA was dropped for 180 minutes into a polymerization reaction system in a boiling point reflux state, 275.6 g (i.e., 1.70 mol) of 80 mass % HEMA was dropped for 180 minutes thereinto, and 42.5 g of 15% NaPS was dropped for 195 minutes thereinto. 45% SHP was also dropped in two stages at the following supply rates thereinto under stirring: 29.2 g thereof was dropped for 18 minutes, and subsequently 114.5 g thereof was dropped for 162 minutes. The respective components were dropped from a tip nozzle through supply paths different from one another. Each of the components except the 45% SHP was continuously dropped at a constant dropping rate. After the completion of the dropping of the 80% AA, polymerization was completed by further maintaining (aging) a reaction solution in the boiling point reflux state over 30 minutes. The resultant polymer aqueous solution (2) had a solid content of 65.0% and a weight-average molecular weight (Mw) of 3,500, and the content of SHP was 1.0 mass % with respect to 100 mass % of the polymer.

Production Example 3

168.0 Grams of pure water was loaded (initial loading) into a SUS separable flask having a volume of 2.5 liters, the flask including a reflux condenser, a stirrer (paddle blade), and a temperature gauge, and its temperature was increased to its boiling point under stirring. Next, under stirring, 416.8 g (i.e., 4.63 mol) of 80% AA was dropped for 180 minutes into a polymerization reaction system in a boiling point reflux state and 23.2 g of 15% NaPS was dropped for 195 minutes thereinto. 45% SHP was also dropped in two stages at the following supply rates thereinto under stirring: 6.4 g thereof was dropped for 18 minutes, and subsequently 30.3 g thereof was dropped for 192 minutes. 92 Minutes after the initiation of polymerization, 119.1 g of pure water was dropped for 88 minutes thereinto under stirring. The respective components were dropped from a tip nozzle through supply paths different from one another. Each of the components except the 45% SHP was continuously dropped at a constant dropping rate. After the completion of the dropping of the 80% AA, the polymerization was completed by further maintaining (aging) a reaction solution in the boiling point reflux state over 30 minutes. After the completion of the polymerization, 200.8 g (content capable of neutralizing 33 mol % of acrylic acid) of an 80 mass % aqueous solution of diethanolamine (hereinafter referred to as "80% DEA") and 35.3 g of the 45% SHP were dropped to the reaction solution under stirring. The resultant polymer aqueous solution (3) had a solid content of 53.0% and a weight-average molecular weight (Mw) of 8,200, and the content of SHP was 3.6 mass % with respect to 100 mass % of the polymer.

Production Example 4

306.3 Grams of pure water was loaded (initial loading) into a SUS separable flask having a volume of 2.5 liters, the flask including a reflux condenser, a stirrer (paddle blade), and a temperature gauge, and its temperature was increased to its boiling point under stirring. Next, under stirring, 412.8 g (i.e., 4.59 mol) of 80% AA was dropped for 180 minutes into a polymerization reaction system in a boiling point reflux state, 149.1 g (i.e., 1.15 mol) of 100 mass % HEMA was dropped for 180 minutes thereinto, and 28.7 g of 15% NaPS was dropped for 195 minutes thereinto. 45% SHP was also dropped in two stages at the following supply rates thereinto under stirring: 14.0 g thereof was dropped for 18 minutes, and subsequently 55.9 g thereof was dropped for 162 minutes. The respective components were dropped from a tip nozzle through supply paths different from one another. Each of the components except the 45% SHP was continuously dropped at a constant dropping rate. After the completion of the dropping of the 80% AA, polymerization was completed by further maintaining (aging) a reaction solution in the boiling point reflux state over 30 minutes. After the completion of the polymerization, 33.2 of the 45% SHP was loaded into the resultant. Thus, a polymer aqueous solution (4) was obtained. The solution had a solid content of 53.0% and a weight-average molecular weight (Mw) of 5,600, and the content of SHP was 3.6 mass % with respect to 100 mass % of the polymer.

Production Example 5

144.1 Grams of pure water was loaded (initial loading) into a SUS separable flask having a volume of 2.5 liters, the flask including a reflux condenser, a stirrer (paddle blade), and a temperature gauge, and its temperature was increased to its boiling point under stirring. Next, under stirring, 544.8 g (i.e., 6.05 mol) of 80% AA was dropped for 180 minutes into a polymerization reaction system in a boiling point reflux state, 351.1 g (i.e., 1.51 mol) of 50 mass % 2-hydroxyethyl acrylate (hereinafter referred to as "50% HEA") was dropped for 180 minutes thereinto, and 37.9 g of 15% NaPS was dropped for 195 minutes thereinto. 45% SHP was also dropped in two stages at the following supply rates thereinto under stirring: 14.8 g thereof was dropped for 18 minutes, and subsequently 68.8 g thereof was dropped for 192 minutes. The respective components were dropped from a tip nozzle through supply paths different from one another. Each of the components except the 45% SHP was continuously dropped at a constant dropping rate. After the completion of the dropping of the 80% AA, polymerization was completed by further maintaining (aging) a reaction solution in the boiling point reflux state over 30 minutes. After the completion of the polymerization, 38.51 of the 45% SHP was loaded into the resultant. Thus, a polymer aqueous solution (5) was obtained. The solution had a solid content of 56.0% and a weight-average molecular weight (Mw) of 5,600, and the content of SHP was 3.7 mass % with respect to 100 mass % of the polymer.

Example 1

25.54 Grams of the polymer aqueous solution (1) obtained in Production Example 1, 0.98 g of 45% SHP, 0.86 g (content capable of neutralizing 10 mol % of acrylic acid) of a 25% aqueous solution of ammonia, 2.12 g of pure water, and 0.50 g (corresponding to 3 mol % with respect to carboxyl groups) of ammonium sulfate were sufficiently stirred to provide a binder (1) having an effective component of 50%. The pH of the binder (1) was 3.5, the polymer in the binder (1) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 16.6 MPa. The weight-average molecular weight (Mw) after the binder (1) had been stored in a thermostat at 50° C. for 30 days was 4,100, and hence the increase ratio of the weight-average molecular weight (Mw) was 17%.

The results are shown in Table 1.

Example 2

25.54 Grams of the polymer aqueous solution (1) obtained in Production Example 1, 0.98 g of 45% SHP, 1.72 g (content capable of neutralizing 20 mol % of acrylic acid) of a 25% aqueous solution of ammonia, 1.25 g of pure water, and 0.50 g (corresponding to 3 mol % with respect to carboxyl groups) of ammonium sulfate were sufficiently stirred to provide a binder (2) having an effective component of 50%. The pH of the binder (2) was 4.0, the polymer in the binder (2) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 16.5 MPa. The weight-average molecular weight (Mw) after the binder (2) had been stored in a thermostat at 50° C. for 30 days was 3,800, and hence the increase ratio of the weight-average molecular weight (Mw) was 9%.

The results are shown in Table 1.

Example 3

22.41 Grams of the polymer aqueous solution (2) obtained in Production Example 2, 0.97 g of 45% SHP, 3.02 g (content capable of neutralizing 35 mol % of acrylic acid) of a 25% aqueous solution of ammonia, 3.11 g of pure water, and 0.50 g (corresponding to 3 mol % with respect to carboxyl groups) of ammonium sulfate were sufficiently stirred to provide a binder (3) having an effective component of 50%. The pH of the binder (3) was 4.5, the polymer in the binder (3) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 16.1 MPa. The weight-average molecular weight (Mw) after the binder (3) had been stored in a thermostat at 50° C. for 30 days was 3,700, and hence the increase ratio of the weight-average molecular weight (Mw) was 6%.

The results are shown in Table 1.

Example 4

25.54 Grams of the polymer aqueous solution (1) obtained in Production Example 1, 0.98 g of 45% SHP, 0.43 g (content capable of neutralizing 5 mol % of acrylic acid) of a 25% aqueous solution of ammonia, 2.55 g of pure water, and 0.50 g (corresponding to 3 mol % with respect to carboxyl groups) of ammonium sulfate were sufficiently stirred to provide a binder (4) having an effective component of 50%. The pH of the binder (4) was 3.0, the polymer in the binder (4) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 16.3 MPa. The weight-average molecular weight (Mw) after the binder (4) had been stored in a thermostat at 50° C. for 30 days was 4,400, and hence the increase ratio of the weight-average molecular weight (Mw) was 26%.

The results are shown in Table 1.

Example 5

20.13 Grams of the polymer aqueous solution (2) obtained in Production Example 2, 0.92 g of 45% SHP, 7.74 g (content capable of neutralizing 100 mol % of acrylic acid) of a 25% aqueous solution of ammonia, and 1.20 g (corresponding to 8 mol % with respect to carboxyl groups) of ammonium sulfate were sufficiently stirred to provide a binder (5) having an effective component of 45%. The pH of the binder (5) was 8.7, the polymer in the binder (5) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 11.8 MPa. The weight-average molecular weight (Mw) after the binder (5) had been stored in a thermostat at 50° C. for 30 days was 3,500, and hence the increase of the weight-average molecular weight (Mw) was not observed.

The results are shown in Table 1.

Example 6

17.16 Grams of the polymer aqueous solution (2) obtained in Production Example 2, 0.77 g of 45% SHP, 5.94 g (content capable of neutralizing 90 mol % of acrylic acid) of a 25% aqueous solution of ammonia, 0.36 g of pure water, and 0.77 g (corresponding to 6 mol % with respect to carboxyl groups) of ammonium sulfate were sufficiently stirred to provide a binder (6) having an effective component of 46%. The pH of the binder (6) was 6.3, the polymer in the binder (6) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 14.4 MPa. The weight-average molecular weight (Mw) after the binder (6) had been stored in a thermostat at 50° C. for 30 days was 3,500, and hence the increase of the weight-average molecular weight (Mw) was not observed.

The results are shown in Table 1.

Example 7

16.79 Grams of the polymer aqueous solution (2) obtained in Production Example 2, 0.75 g of 45% SHP, 6.13 g (content capable of neutralizing 95 mol % of acrylic acid) of a 25% aqueous solution of ammonia, 0.58 g of pure water, and 0.75 g (corresponding to 6 mol % with respect to carboxyl groups) of ammonium sulfate were sufficiently stirred to provide a binder (7) having an effective component of 45%. The pH of the binder (7) was 7.0, the polymer in the binder (7) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 12.8 MPa. The weight-average molecular weight (Mw) after the binder (7) had been stored in a thermostat at 50° C. for 30 days was 3,500, and hence the increase of the weight-average molecular weight (Mw) was not observed.

The results are shown in Table 1.

Comparative Example 1

25.54 Grams of the polymer aqueous solution (1) obtained in Production Example 1, 0.98 g of 45% SHP, 2.98 g of pure water, and 0.50 g (corresponding to 3 mol % with respect to carboxyl groups) of ammonium sulfate were sufficiently stirred to provide a binder (C1) having an effective component of 50%. The pH of the binder (C1) was 2.4, the polymer in the binder (C1) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 16.8 MPa. The weight-average molecular weight (Mw) after the binder (C1) had been stored in a thermostat at 50° C. for 30 days was 4,750 and hence the increase ratio of the weight-average molecular weight (Mw) was 36%.

The results are shown in Table 1.

Comparative Example 2

20.19 Grams of the polymer aqueous solution (2) obtained in Production Example 2, 0.84 g of 45% SHP, 7.76 g (content capable of neutralizing 100 mol % of acrylic acid) of a 25% aqueous solution of ammonia, and 1.21 g of pure water were sufficiently stirred to provide a binder (C2) having an effective component of 45%. The pH of the binder (C2) was 8.7, the polymer in the binder (C2) had a weight-average molecular weight (Mw) of 3,500, and the content of SHP was 4.0 mass % with respect to 100 mass % of the polymer. A test piece produced by the above-mentioned method was evaluated for its mechanical strength. As a result, the mechanical strength was 10.1 MPa. The weight-average molecular weight (Mw) after the binder (C2) had been stored in a thermostat at 50° C. for 30 days was 3,500, and hence the increase of the weight-average molecular weight (Mw) was not observed.

The results are shown in Table 1.

Comparative Example 3

24.34 Grams of the polymer aqueous solution (3) obtained in Production Example 3, 4.37 g (content capable of neutralizing 57 mol % of acrylic acid) of a 25% aqueous solution of ammonia, 0.84 g of pure water, and 0.45 g (corresponding to 3 mol % with respect to carboxyl groups) of ammonium sulfate were sufficiently stirred to provide a binder (C3) having an effective component of 43%. The pH of the binder (C3) was 6.3, the polymer in the binder (C3) had a weight-average molecular weight (Mw) of 8,200, and the content of SHP was 3.6 mass % with respect to 100 mass % of the polymer. A test piece produced by the above-mentioned method was evaluated for its mechanical strength. As a result, the mechanical strength was 10.2 MPa. The weight-average molecular weight (Mw) after the binder (C3) had been stored in a thermostat at 50° C. for 30 days was 8,200, and hence the increase of the weight-average molecular weight (Mw) was not observed.

The results are shown in Table 1.

TABLE 1

|  | Polymer composition (mol %) | Cross-linking agent (mol %) | Neutralization ratio with ammonia (mol %) | Amount of ammonium sulfate with respect to carboxyl groups (mol %) | pH | Strength (MPa) | Mw | Mw (stored at 50° C.) | Mw increase ratio (%) |
|---|---|---|---|---|---|---|---|---|---|
| Example 1 | AA/HEMA (80/20) | — | 10 | 3 | 3.5 | 16.6 | 3,500 | 4,100 | 17 |

TABLE 1-continued

|  | Polymer composition (mol %) | Cross-linking agent (mol %) | Neutral-ization ratio with ammonia (mol %) | Amount of ammonium sulfate with respect to carboxyl groups (mol %) | pH | Strength (MPa) | Mw | Mw (stored at 50° C.) | Mw increase ratio (%) |
|---|---|---|---|---|---|---|---|---|---|
| Example 2 | AA/HEMA (80/20) | — | 20 | 3 | 4.0 | 16.5 | 3,500 | 3,800 | 9 |
| Example 3 | AA/HEMA (80/20) | — | 35 | 3 | 4.5 | 16.1 | 3,500 | 3,700 | 6 |
| Example 4 | AA/HEMA (80/20) | — | 5 | 3 | 3.0 | 16.3 | 3,500 | 4,400 | 26 |
| Example 5 | AA/HEMA (80/20) | — | 100 | 8 | 8.7 | 11.8 | 3,500 | 3,500 | 0 |
| Example 6 | AA/HEMA (80/20) | — | 90 | 6 | 6.3 | 14.4 | 3,500 | 3,500 | 0 |
| Example 7 | AA/HEMA (80/20) | — | 95 | 6 | 7.0 | 12.8 | 3,500 | 3,500 | 0 |
| Comparative Example 1 | AA/HEMA (80/20) | — | 0 | 3 | 2.4 | 16.8 | 3,500 | 4,750 | 36 |
| Comparative Example 2 | AA/HEMA (80/20) | — | 100 | 0 | 8.7 | 10.1 | 3,500 | 3,500 | 0 |
| Comparative Example 3 | AA (100) | DEA (33) | 57 | 3 | 6.3 | 10.2 | 8,200 | 8,200 | 0 |

The results shown in Table 1 have revealed that the binder of the present invention has satisfactory storage stability, and the cured product of the glass beads treated with the binder of the present invention has a satisfactory strength.

Example 8

37.71 Grams of the polymer aqueous solution (4) obtained in Production Example 4, 0.03 g of 45% SHP, 1.18 g (content capable of neutralizing 10 mol % of acrylic acid) of a 25% aqueous solution of ammonia, 0.91 g (corresponding to 1 mol % with respect to acrylic acid) of a 25% aqueous solution of ammonium sulfate, and 0.17 g of pure water were sufficiently stirred to provide a binder (8) having an effective component of 50%. The polymer in the binder (8) had a weight-average molecular weight (Mw) of 5,600, and the content of SHP was 3.7 mass % with respect to 100 mass % of the polymer. A test piece produced by the above-mentioned method was evaluated for its mechanical strength. As a result, the mechanical strength was 12.5 MPa. The test piece was evaluated for its hydrolysis resistance. As a result, the mechanical strength was 12.0 MPa, and hence the retention ratio of the strength was 96.0%. The weight-average molecular weight (Mw) after the binder (8) had been stored in a thermostat at 50° C. for 30 days was 6,600, and hence the increase ratio of the weight-average molecular weight (Mw) was 18%.

The results are shown in Table 2.

Example 9

35.71 Grams of the polymer aqueous solution (5) obtained in Production Example 5, 1.23 g (content capable of neutralizing 10 mol % of acrylic acid) of a 25% aqueous solution of ammonia, 2.86 g (corresponding to 1 mol % with respect to acrylic acid) of a 25% aqueous solution of ammonium sulfate, and 0.20 g of pure water were sufficiently stirred to provide a binder (9) having an effective component of 50%. The polymer in the binder (9) had a weight-average molecular weight (Mw) of 5,600, and the content of SHP was 3.6 mass % with respect to 100 mass % of the polymer. A test piece produced by the above-mentioned method was evaluated for its mechanical strength. As a result, the mechanical strength was 11.0 MPa. The test piece was evaluated for its hydrolysis resistance. As a result, the mechanical strength was 5.5 MPa, and hence the retention ratio of the strength was 50.0%. The weight-average molecular weight (Mw) after the binder (9) had been stored in a thermostat at 50° C. for 30 days was 6,700, and hence the increase ratio of the weight-average molecular weight (Mw) was 20%.

The results are shown in Table 2.

TABLE 2

|  | Polymer composition (molar ratio) | Neutral-ization ratio with ammonia (mol %) | Neutral-ization ratio with NaOH (mol %) | Amount of ammonium sulfate with respect to carboxyl groups (mol %) | Strength (MPa) | Hydrolysis resistance evaluation Strength (MPa) | Retention ratio (%) | Mw (stored at 50° C.) | Mw increase ratio (%) |
|---|---|---|---|---|---|---|---|---|---|
| Example 8 | AA/HEMA (80/20) | 10 | 0 | 1 | 12.5 | 12.0 | 96 | 5,600 | 6,600 | 18 |
| Example 9 | AA/HEA (80/20) | 10 | 0 | 1 | 11.0 | 5.5 | 50 | 5,600 | 6,700 | 20 |

INDUSTRIAL APPLICABILITY

The binder of the present invention can be usefully used as, for example, a binder for a heat-insulating material for a house.

The invention claimed is:

1. A binder, comprising:
a polymer having a hydroxyl group; and
an ammonium salt of an inorganic acid, wherein:
the polymer contains a structural unit derived from a monomer represented by the general formula (1) and a structural unit derived from a monomer containing at least one of a carboxylic acid group and a salt of the carboxylic acid group;
a content of the structural unit derived from the monomer represented by the general formula (1) is from 5 mol % to 40 mol % with respect to 100 mol % of structural units derived from all monomers;
a content of the structural unit derived from the monomer containing the at least one of the carboxylic acid group and the salt of the carboxylic acid group is from 60 mol % to 95 mol % with respect to 100 mol % of the structural units derived from all the monomers;
2 mol % or more of the at least one of the carboxylic acid groups and the salts of the carboxylic acid groups in the polymer are neutralized with a volatile base and/or a nonvolatile base;
0 mol % to 35 mol % of the at least one of the carboxylic acid groups and the salts of the carboxylic acid groups in the polymer are neutralized with the nonvolatile base; and
0 mol % to 100 mol % of the at least one of the carboxylic acid groups and the salts of the carboxylic acid groups in the polymer are neutralized with the volatile base:

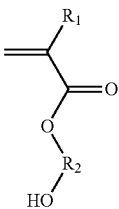

General formula (1)

in the general formula (1), $R_1$ represents a hydrogen atom or a methyl group, and $R_2$ represents an organic group having 2 to 20 carbon atoms.

2. An aqueous solution, comprising:
a polymer having a hydroxyl group; and
an ammonium salt of an inorganic acid, wherein:
the polymer contains a structural unit derived from a monomer represented by the general formula (1) and a structural unit derived from a monomer containing at least one of a carboxylic acid group and a salt of the carboxylic acid group;
a content of the structural unit derived from the monomer represented by the general formula (1) is from 5 mol % to 40 mol % with respect to 100 mol % of structural units derived from all monomers;
a content of the structural unit derived from the monomer containing the at least one of the carboxylic acid group and the salt of the carboxylic acid group is from 60 mol % to 95 mol % with respect to 100 mol % of the structural units derived from all the monomers;
2 mol % or more of the at least one of the carboxylic acid groups and the salts of the carboxylic acid groups in the polymer are neutralized with a volatile base and/or a nonvolatile base;
0 mol % to 35 mol % of the at least one of the carboxylic acid groups and the salts of the carboxylic acid groups in the polymer are neutralized with the nonvolatile base;
0 mol % to 100 mol % of the at least one of the carboxylic acid groups and the salts of the carboxylic acid groups in the polymer are neutralized with the volatile base; and
the aqueous solution contains 20 mass % or more and 99.9 mass % or less of water:

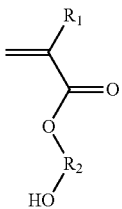

General formula (1)

in the general formula (1), $R_1$ represents a hydrogen atom or a methyl group, and $R_2$ represents an organic group having 2 to 20 carbon atoms.

* * * * *